(12) United States Patent
Dorran et al.

(10) Patent No.: US 7,453,559 B2
(45) Date of Patent: Nov. 18, 2008

(54) VEHICLE LIFT REFERENCE SYSTEM FOR MOVABLE MACHINE-VISION ALIGNMENT SYSTEM SENSORS

(75) Inventors: Daniel R. Dorran, Ballwin, MO (US); Timothy A. Strege, Sunset Hills, MO (US); Leigh R. Burns, Jr., Troy, IL (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 11/461,309

(22) Filed: Jul. 14, 2006

(65) Prior Publication Data

US 2006/0279728 A1    Dec. 14, 2006

Related U.S. Application Data

(63) Continuation-in-part of application No. 10/682,247, filed on Oct. 9, 2003, now Pat. No. 7,164,472.

(60) Provisional application No. 60/704,408, filed on Aug. 1, 2005.

(51) Int. Cl.
*G01B 11/26* (2006.01)

(52) U.S. Cl. .................. 356/139.09; 356/139.01; 356/139.1

(58) Field of Classification Search ............ 356/139.09, 356/3.01–3.15, 4.01–4.1, 5.01–5.15, 6–22, 356/128, 128.5, 139.01–139.1
See application file for complete search history.

(56) References Cited

U.S. PATENT DOCUMENTS

| 5,675,515 | A | | 10/1997 | January |
| 5,724,128 | A | * | 3/1998 | January ................. 356/139.09 |
| 6,064,750 | A | | 5/2000 | January et al. |
| 6,151,562 | A | * | 11/2000 | Merrill ....................... 702/95 |
| 6,189,432 | B1 | | 2/2001 | Colarelli et al. |
| 6,298,284 | B1 | | 10/2001 | Burns, Jr. et al. |
| 6,731,382 | B2 | | 5/2004 | Jackson et al. |
| 6,839,972 | B2 | | 1/2005 | Jackson et al. |
| 6,894,771 | B1 | | 5/2005 | Dorrance et al. |
| 6,931,340 | B2 | | 8/2005 | Jackson et al. |
| 6,959,253 | B2 | | 10/2005 | Jackson et al. |
| 6,968,282 | B1 | | 11/2005 | Jackson et al. |
| 2006/0126966 | A1 | | 6/2006 | Strege et al. |

FOREIGN PATENT DOCUMENTS

DE            2948573 A1  *   6/1981

* cited by examiner

*Primary Examiner*—Thomas H. Tarcza
*Assistant Examiner*—Luke D Ratcliffe
(74) *Attorney, Agent, or Firm*—Polster, Lieder, Woodruff & Lucchesi, L.C.

(57) ABSTRACT

A method for enabling a vehicle wheel alignment system to compensate an imaging sensor coordinate system for changes associated with adjustments to the pose of an imaging sensor, following movement of a vehicle lift mechanism supporting a vehicle undergoing a vehicle wheel alignment procedure.

20 Claims, 8 Drawing Sheets

VEHICLE LIFT REFERENCE SYSTEM FOR MOVABLE MACHINE-VISION ALIGNMENT SYSTEM SENSORS

CROSS-REFERENCE TO RELATED APPLICATIONS

The present application is a continuation-in-part of U.S. patent application Ser. No. 10/682,247 filed on Oct. 9, 2003, from which priority is claimed, and which is herein incorporated by reference.

The present application is further related to, and claims priority from, U.S. Provisional Patent Application No. 60/704,408 filed on Aug. 1, 2005, which is herein incorporated by reference.

STATEMENT REGARDING FEDERALLY SPONSORED RESEARCH

Not Applicable.

BACKGROUND OF THE INVENTION

The present invention relates to machine vision vehicle wheel alignment systems, and in particular to machine vision vehicle wheel alignment systems configured with imaging sensor systems which are mounted to movable vehicle support structures, enabling adjustments to the fields of view of the imaging sensor arrays for accommodating changes in the elevation of a vehicle supported by an adjustable vehicle lift structure.

Machine-vision vehicle wheel alignment systems typically use one or more imaging sensor arrays mounted away from a vehicle to obtain images of wheel-mounted alignment targets or other identifiable features associated with a vehicle. If utilized, the alignment targets may incorporate accurately reproduced patterns that have known control features, as set forth in U.S. Pat. No. 6,064,750 herein incorporated by reference. The alignment system may then use these images to calculate some or all of the six degrees of freedom (6-DOF) components for the alignment targets or identifiable features in the images. The 6-DOF components consisting of positional data (X, Y, and Z coordinates) and rotational data (rotation about the X, Y, and Z axis), which are otherwise known collectively as pose, and individually as pose components. Using some or all of the calculated six degrees of freedom components, or pose information, various vehicle wheel alignment measurements may be determined using known mathematical techniques. The precision of the 6-DOF components is limited by how accurately identifiable features of interest can be located in the image of the wheel assembly 100.

Some machine-vision wheel alignment systems do not use a predefined alignment target, but rather identify either random or selected identifiable features on the surfaces of the wheel or tire of a wheel assembly, such as projected light stripes or the circular wheel rim, and may use positional changes and/or the distortions of the feature geometry to determine some or all of the pose components for the wheel or wheel assembly, such as shown in U.S. Pat. No. 6,894,771 to Dorrance et al. herein incorporated by reference.

During a vehicle wheel alignment service procedure, it is common for a vehicle undergoing the service procedure to be positioned on an vehicle lift system such as shown in FIG. 1 to enable a technician to raise and lower the vehicle, as is required to access various components on the underside of the vehicle. A wide variety of vehicle lift systems are known. One type of vehicle lift system provides a pair of vertically adjustable runways on which the vehicle wheels are disposed. The runways may be either independent of each other, or coupled together with a connecting structure. Examples of vehicle lift systems employing two vertically adjustable runways include the model RX scissor lift rack, the model L421 Four-Post lift rack, and the RM parallelogram lift rack, each manufactured and sold by Hunter Engineering Co. of Bridgeton, Mo.

Typically, each runway in a vehicle lift system is provided with one or more actuating mechanisms, such as a hydraulic cylinder or screw drive, which is controlled from a common location to regulate the vertical elevation of the individual runways. For safety reasons, the control system which regulates the actuating mechanisms is generally configured to maintain each runway in substantially the same horizontal plane during changes in elevation. An exemplary lift control system is shown in U.S. Pat. No. 6,189,432 to Colarelli et al. herein incorporated by reference. Additionally, a mechanism is commonly provided to "lock" the runways at one or more predetermined heights during elevation or when the runways are stationary, preventing collapse of the vehicle lift system in the event of a failure in one or more of the actuating mechanisms.

When a vehicle is disposed on a vehicle lift system, it is preferred that the imaging sensor arrays associated with the alignment system be connected to a suitable elevating or orientating mechanism so that the alignment targets, vehicle wheel assemblies, or other vehicle features, remain within the fields of view of the imaging sensor arrays over the entire range of motion of the vehicle lift rack. Automated or manual elevating or orientating mechanisms may be utilized, such as described in U.S. Pat. No. 6,298,284 to Burns, Jr. et al. herein incorporated by reference. These may include hydraulic or pneumatic post systems, jack screws with motors, rack and pinion systems, and the like.

When components of the vehicle wheel alignment system such as the imaging sensor arrays are physically moved, either through changes in elevation or changes in orientation, established or identified relationships between the components can change. To maintain the degree of accuracy necessary for determining vehicle wheel alignment angles from the images obtained by the imaging sensor arrays, these changes must be identified and compensated for by the vehicle wheel alignment system. Accordingly, it would be advantageous to provide a method by which changes in the physical relationships between individual components of the vehicle wheel alignment system, such as multiple imaging sensor arrays, can be identified and compensated for, following a change in the physical location or orientation (pose) of the individual components of the vehicle wheel alignment system.

BRIEF SUMMARY OF THE INVENTION

Briefly stated, a method of the present invention enables a vehicle wheel alignment system to compensate an imaging sensor coordinate system for changes associated with adjustments to the position and orientation (pose) of an imaging sensor array following positional changes in a vertically movable runway of an automotive vehicle lift system supporting a vehicle. The method starts by acquiring an initial measurement set with the imaging sensor array and movable runway in a first relationship, from which a determination of a "home" position and orientation (pose) of the imaging sensor array is made. Subsequent to an alteration of a pose component of the imaging sensor array in response to a positional change in the movable runway, a second measurement set is acquired with the imaging sensor array. One or more adjustment factors are determined for the altered pose of the imaging sensor array by comparison of the second measurement set with the initial measurement set.

In an alternate method of the present invention, the initial and second measurement sets are acquired from measurements of an unaltered vehicle wheel alignment angle associated with a vehicle disposed in the same position on the vertically movable runway at first and second positions of the movable runway, respectively.

In an alternate method of the present invention, the initial and second measurement sets are acquired from unaltered observable features such as predetermined targets secured to the vertically movable runway.

In an alternate method of the present invention, the initial and second measurement sets are acquired from predetermined targets removably disposed on the vertically movable runway.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 3A:
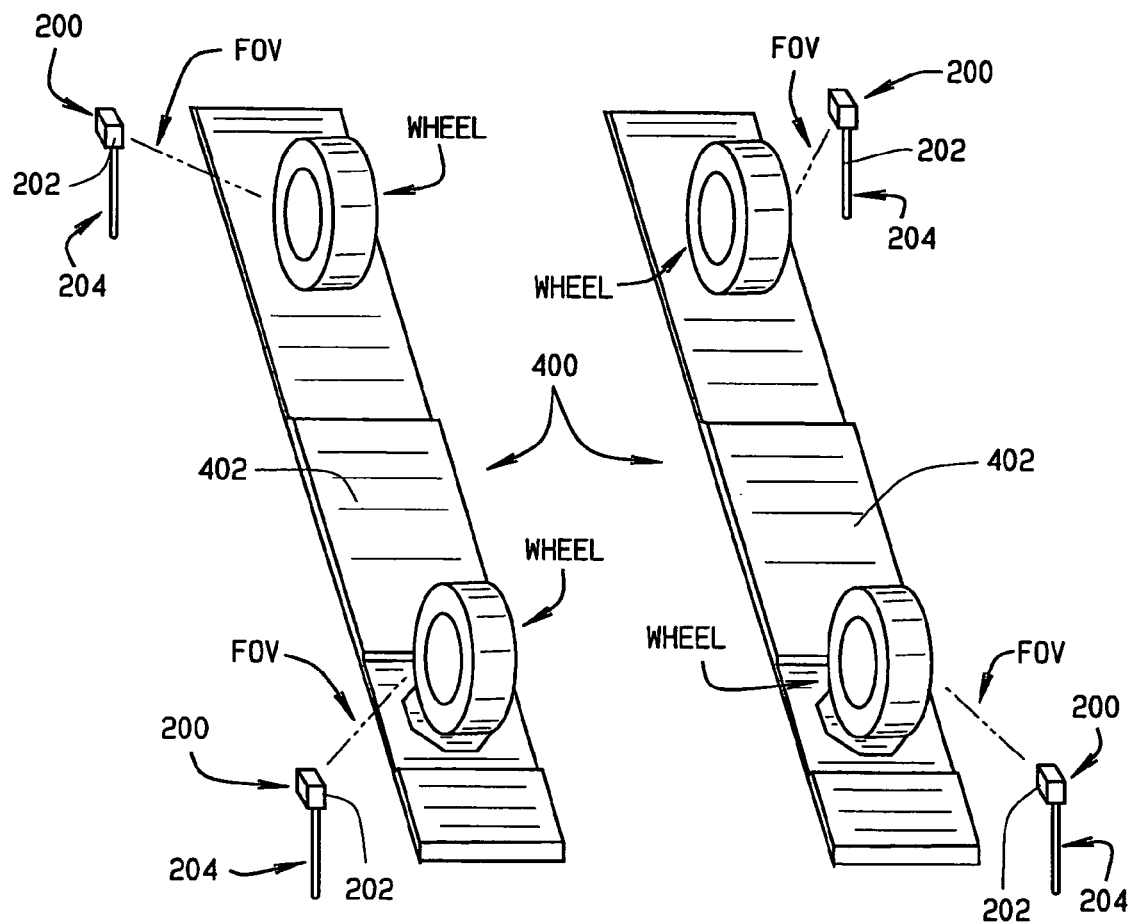
FIG. 3A is a perspective illustration of a set of discrete imaging sensors disposed on independently adjustable mountings adjacent each vehicle wheel position.
Figure 3B:
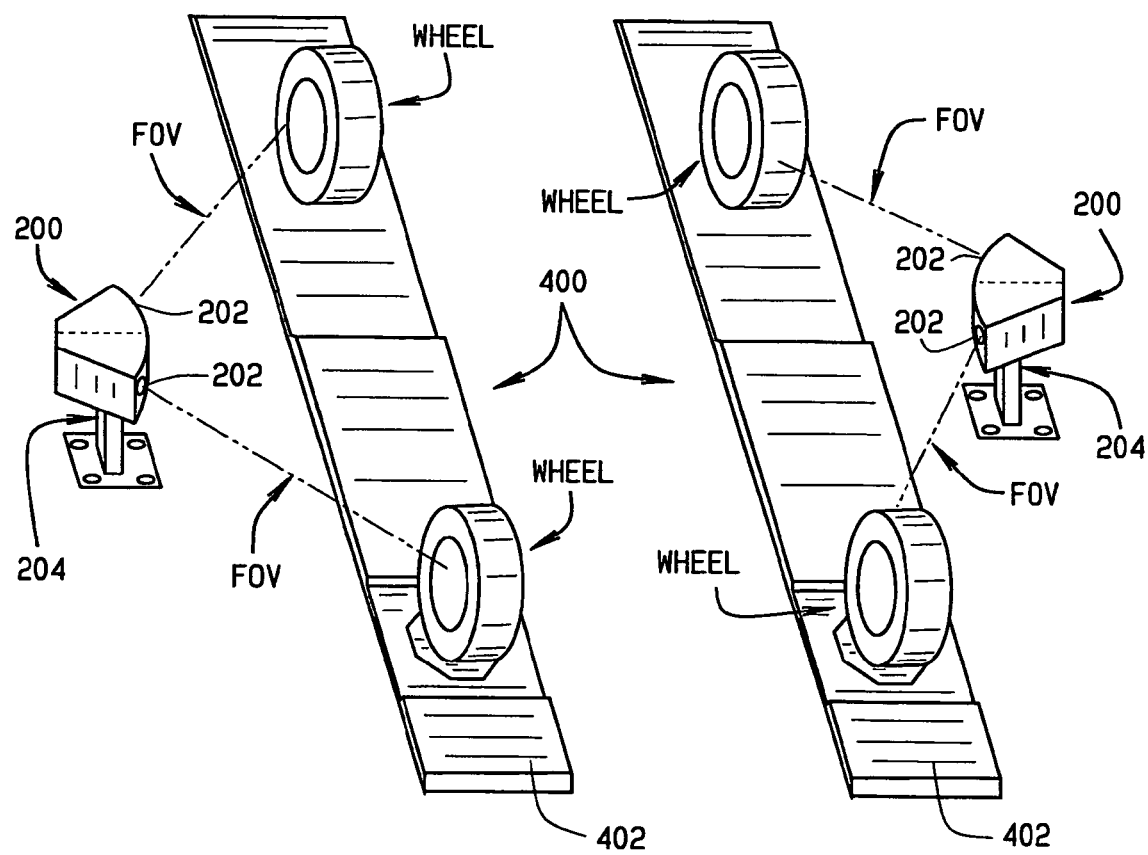
FIG. 3B is a perspective illustration of a set of discrete imaging sensors disposed on laterally opposite sides of a vehicle position.
Figure 4:
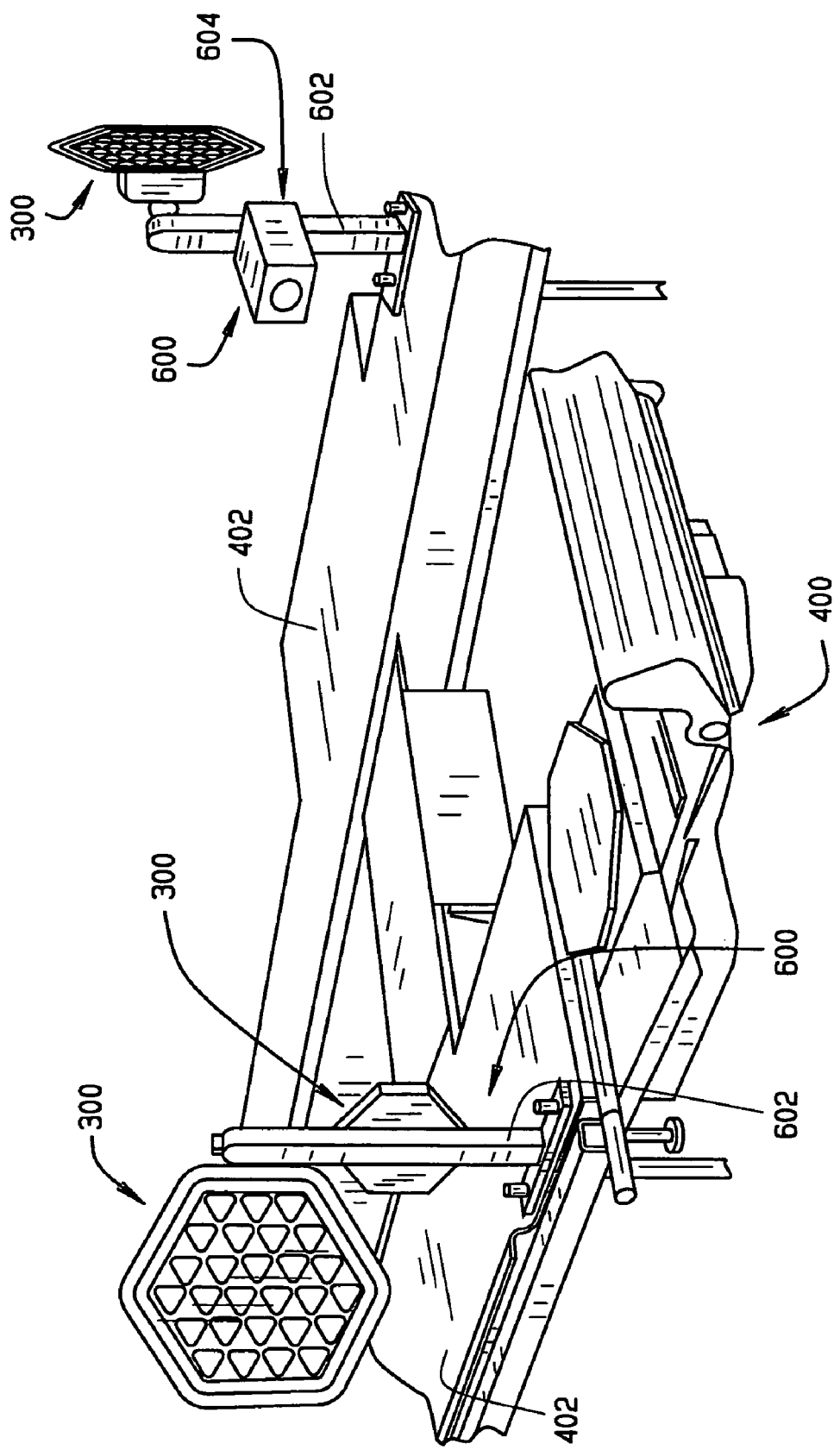
FIG. 4 is a perspective illustration of a cross-looking camera calibration system.
Figure 5:
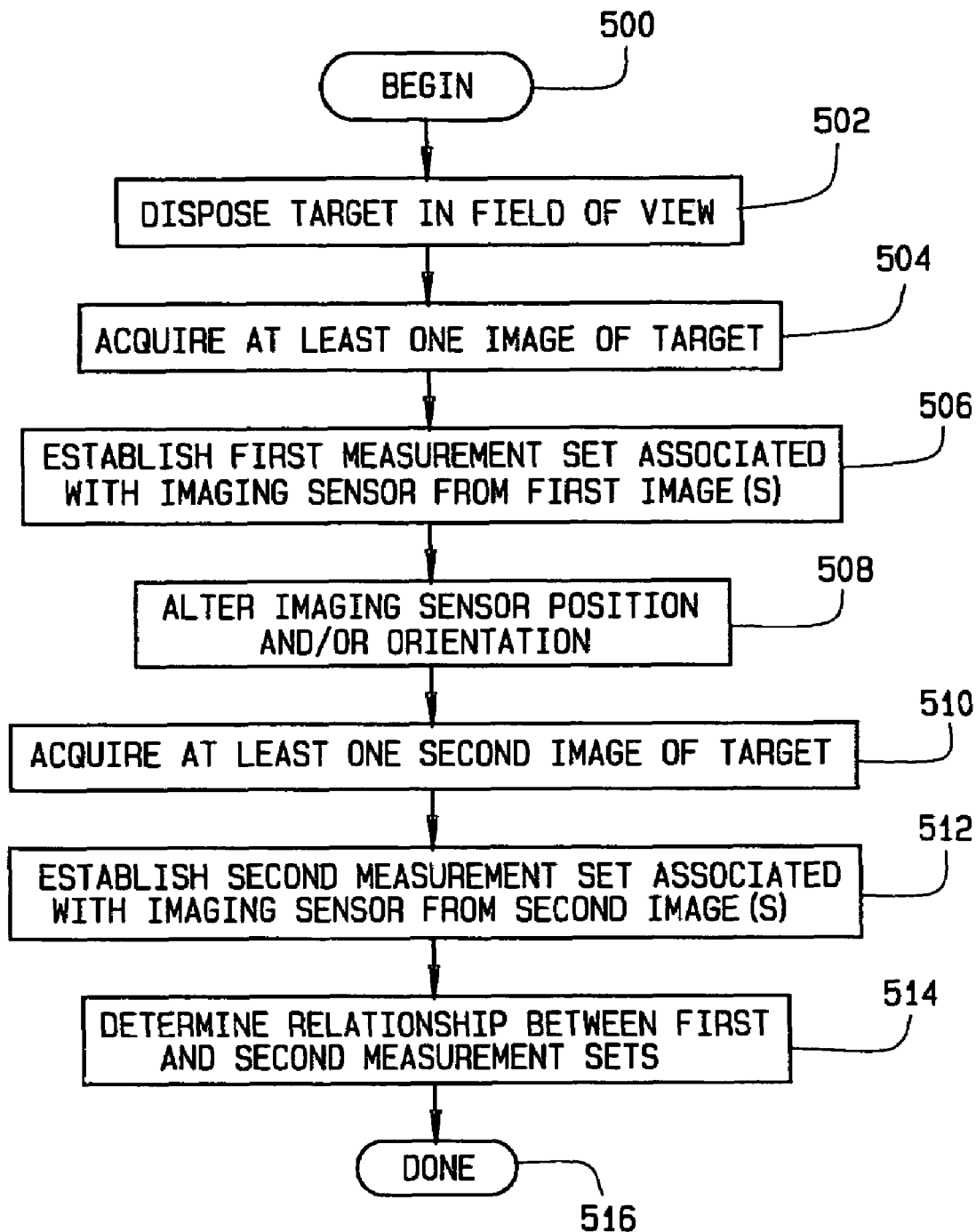
FIG. 5 is a flow chart illustrating the steps of a method of the present invention.

The methods and apparatus of the present invention as described herein and shown in FIGS. 3-5 are generally adapted for use with a processor-controlled vehicle wheel alignment system. A vehicle wheel alignment system typically consists of a processing system configured to carry out software instructions for the computation and measurement of vehicle wheel alignment angles. The processing system may be a single or multi-processor computer, a micro-controller, or other suitable logic circuit, configured to receive data from, and/or communicate with, one or more devices such as measurement sensors, an operator interface, a data storage system, or external data interfaces such as a computer network.

The measurement sensors include one or more imaging sensor arrays 200, such as a the sets of cameras 202 or other imaging devices as shown in U.S. Pat. No. 5,675,515 to January herein incorporated by reference, configured to acquire images of optical targets 300 or identifiable features disposed within an associated field of view (FOV). The optical targets 300 may be predetermined wheel-mounted alignment targets 302, or may be identifiable features visible in the field of view (FOV) of the imaging sensor arrays 200, such as a part of the vehicle, vehicle wheel, or vehicle lift mechanism 400.

The cameras 200 or imaging devices may be disposed on adjustable mountings 204, either discretely as shown in FIG. 3A adjacent the vehicle wheel positions, or in sets such as shown in FIG. 3B, such that a position and/or orientation of the cameras 202 or imaging devices can be altered to maintain the optical targets 300 or identifiable features within the associated fields of view (FOV) following movement of the vehicle lift mechanism 400 upon which a vehicle undergoing an alignment service procedure is disposed. The placement of the cameras 202 or imaging devices about the vehicle service area may be varied to provide each camera 202 or imaging sensor with a field of view (FOV) suitable for acquiring images of the desired visible features 300 or alignment targets 302. For example, as shown in FIG. 3A, a single camera 202 or imaging device may be disposed in proximity to each vehicle wheel position to provide discrete fields of view (FOV) of the vehicle wheels and surrounding structures. Alternatively, as shown in FIG. 3B, two or more of the cameras 202 or imaging devices may be disposed adjacent the lateral sides of the vehicle or vehicle support structure 400 on a common support member, approximately midway between the front and rear of the vehicle. Preferably, each camera 202 or imaging device has a field of view (FOV) suitable for acquiring images of the desired visible features 300 or alignment targets 302. For example, as shown in FIG. 3B, at least one camera 202 or imaging device on each common support member has a field of view which encompasses a front vehicle wheel on the adjacent side of the vehicle, while at least one additional camera 202 or imaging device has a field of view (FOV) which encompasses a rear vehicle wheel on the same side of the vehicle.

Images acquired by the cameras 302 or imaging devices are processed, either by a central processing unit (not shown) of the wheel alignment system 100, or a separate image processing unit (not shown) associated with the imaging sensor array 200, to identify a position and orientation (pose) of the optical targets 300, alignment targets 302, or identifiable features in three-dimensional space. As is well understood in the art, geometric relationships between multiple optical targets 300, alignment targets 302, or identifiable features and the image sensor array 200 can be determined from the acquired images, and utilized in the calculation of various vehicle parameters, such as camber, caster, and toe wheel alignment angles.

In general, to compensate components of an imaging sensor array 200, such as cameras 202, for changes associated with adjustments to pose following positional changes of the vehicle lift system 400, the process begins with acquiring an initial measurement set with the imaging sensor array 200 and vehicle lift system 400 in a first relationship. This initial measurement set defines a "home" or "calibration" position and orientation (pose) for the components of the imaging sensor array 200 in reference to the object or feature observed by the imaging sensor array 200. Exemplary initial measurement sets may include measurements of a vehicle lift position, one or more vehicle wheel alignment angles, or the spatial configuration of one or more optical targets 300, alignment targets 302, or identifiable features present in the field of view (FOV) of the cameras 202 or components of the imaging sensor array 200.

During the calibration process, mathematical transforms are determined between each of the imaging sensors and a common reference coordinate system. Methods for determining these transforms are already well known in the art. For this example we will assume the plane of the lift where the vehicle rests defines the x-y reference plane of the common reference coordinate system. The transforms are defined by three translation parameters, and three Euler angle rotation parameters: [Tx, Ty, Tz, Rx, Ry, Rz]. The transform from the left front imaging sensor to common reference coordinate system is represented by TLFtoC. The transforms for right front, left rear and right rear imaging sensors to the common reference coordinate system are similarly notated TRFtoC, TLRtoC, and TRRtoC.

The alignment parameters for a vehicle are then determined with the imaging sensor arrays 200 and vehicle lift mechanism 400 in the "home" position using methods already know in the art. The alignment angles are based on measurements made by each imaging sensor array 200 of the location of the wheel and the axis of rotation (AOR) in the imaging sensor array's coordinate system. These measurements are then transformed to the common reference coordinate system and the primary alignment parameters are computed. For instance, a Vehicle Center Line may be defined as a line that extends from a midpoint of a vehicle's rear axle to a midpoint of the vehicle's front axle. Toe alignment angles may be determined by computing the angles between the AOR vectors and the Vehicle Center Line projected onto the x-y reference plane of the vehicle lift mechanism 400 (the x-y plane of the common reference coordinate system in this example). Camber angles may be determined by computing the inclination angle between the AOR vectors and the common reference plane. Another important angle is referred to as the Caster Adjust angle. This angle is roughly equivalent to the amount that the vehicle wheels have rolled forward or backward since a Caster measurement was determined using a steering procedure. The vehicle wheel alignment system 100 stores the alignment parameters measured in the "home" position.

In many situations, it is desired to elevate the vehicle so that a technician can make adjustments to the vehicle to properly align the wheels. At this point the technician will either indicate to the vehicle wheel alignment system 100 that the vehicle will be lifted or the vehicle wheel alignment system 100 may be configured to automatically determine that the vehicle is being lifted. It is assumed, for this example, that the imaging sensor arrays 200 will move in order to maintain the wheel/tire assemblies in a field of view (FOV). When both the vehicle list mechanism 400 and imaging sensor arrays 200 are in the altered or lifted position, the physical relationship between the imaging sensor arrays 200 and the common reference coordinate system will have changed so the mathematical transforms between the imaging sensor arrays 200 and the common reference coordinate system that were computed in the "home" position may be incorrect, and yield erroneous alignment measurements. However, at this point it is assumed that the actual physical alignment of the vehicle has not changed as a result of the movement of either the imaging sensor arrays 200 or the change in elevation of the vehicle lift mechanism 400 on which the vehicle is disposed. This knowledge can be used to adjust the transforms at the elevated position of the vehicle lift mechanism 400.

Following an alteration of the pose of one or more of the components 202 of the imaging sensor array 200, such as in response to a positional change in the vehicle lift system 400, a second measurement set of the same objects or features is acquired from a new set of images generated by the imaging sensor array 200 in the altered position. Assuming that the object or feature has not changed in response to the positional change in the vehicle lift system 400, a comparison of the second measurement set with the initial measurement set may be used to determine one or more adjustment factors for the altered pose of the components 202 of the imaging sensor array 200 from the initial pose. These adjustment factors or mathematical transforms may be subsequently utilized to transform new pose of the imaging sensor array 200 into a coordinate reference system associated with the initial pose thereof, or vice versa.

One technique to adjust the transforms is to use a Levenburg-Marquardt (LevMar) optimization. The parameters to be optimized would be the four transforms between the imaging sensor components and the common reference coordinate system: TLFtoC [Tx,Ty,Tz,Rx,Ry,Rz], TRFtoC [Tx,Ty,Tz, Rx,Ry,Rz], TLRtoC [Tx,Ty,Tz,Rx,Ry,Rz], and TRRtoC [Tx, Ty,Tz,Rx,Ry,Rz], resulting in 24 total parameters. An error vector may be determined by computing the differences between alignment parameters computed from measurement of the vehicle in the raised position using the transform set being optimized, and the same alignment parameters measured at the "home" position. Exemplary alignment parameters used in the optimization may be Vehicle Center Line points (rear axle midpoint [x,y,z] and front axle midpoint[x, y,z]), Toe values for each wheel, Camber values for each wheel, Caster Adjust values for each wheel, Thrust Vector for both front and rear axle, Total Toe for both front and rear axle, Track Width for both front and rear axle, and Wheel Base measurement for both left and right sides. Use of these values yields an error vector having 26 parameters. Other alignment parameters may be added to increase accuracy or to help decrease the number of iterations required for the optimization to converge.

Those of ordinary skill in the art will recognize that the LevMar optimization requires that the transform parameters to be optimized are initialized using an initial guess of seed values that would be relatively close to the expected final values. For this optimization, the initial seed values may be set to the "home" mathematical transforms or adjustment factors. An alternate guess may be computed using knowledge of how the imaging sensor arrays 200 and vehicle lift mechanism 400 move mechanically. The optimization process uses the current guess of the transform parameters to recomputed the alignment parameters and generate an error vector. Using the values of the error vector, a residue value is computed. The residue value is compared against a selected limit to determine whether the optimization is complete. If the residue value is greater than the selected limit, the optimization generates a differential matrix or Jacobian using a similar process. The Jacobian is used to determine a next guess for the transform parameters. The optimization continues until the residue value is sufficiently low.

The optimized transforms are then used in the measurement process for so long as the vehicle lift mechanism 400 and the imaging sensor arrays 200 remain in the current position. After adjustments to the vehicle have been completed, the technician may want to lower the vehicle by returning the vehicle lift mechanism 400 to a lowered position. The technician may indicate to the vehicle wheel alignment system 100 that the vehicle lift mechanism 400 and the imaging sensor arrays 200 will be lowered or the vehicle wheel alignment system 100 can be configured to automatically determine that the vehicle lift mechanism 400 and the imaging sensor arrays 200 are being moved. When the vehicle lift mechanism 400 and imaging sensor arrays 200 are back in their "home" position, the vehicle wheel alignment system 100 will then use the "home" transforms that were determined when the vehicle wheel alignment system 100 was initially calibrated.

With reference to FIG. 5, a method of the present invention begins (Box 500) with the initial step of establishing a "home" or "calibration" measurement set for the imaging sensor array components 200, which requires defining a reference plane P utilizing the vehicle wheel alignment system 100 and a set of alignment targets 302 which are mounted to the wheel assemblies of a vehicle disposed on vehicle lift system 400 in the field of view (FOV) of the imaging sensor array 200 (Box 502). Images of the alignment targets 300 are acquired by the imaging sensor array 200 (Box 504). From the acquired images, the vehicle wheel alignment system 100 is configured to establish initial measurements of the vehicle alignment angles or to establish a relationship between the imaging sensor array components 202 and the vehicle (Box 506). Those of ordinary skill in the art will recognize that the initial measurements or relationship may be determined from either the observed pose of the alignment targets 300, from calculated points based on the observed pose of the alignment targets 300, or from a combination of observed and calculated points.

Following an alteration of the pose of the components 202 of the imaging sensor array 200 (Box 508), such as in response to a positional change in the vehicle lift system 400, a second set of vehicle alignment measurements is acquired (Box 510) from a new set of images of the alignment targets generated by the imaging sensor array 200. Assuming that the vehicle wheel alignment angles have not significantly changed between the acquisition of the first set of images and the second set of images, a comparison (Box 512) of the second set of measurements with the initial measurements yields one or more adjustment factors (Box 514) for the altered pose of the components 202 of the imaging sensor array 200 from the initial pose, relative to the observed alignment targets 300.

Figure 1:
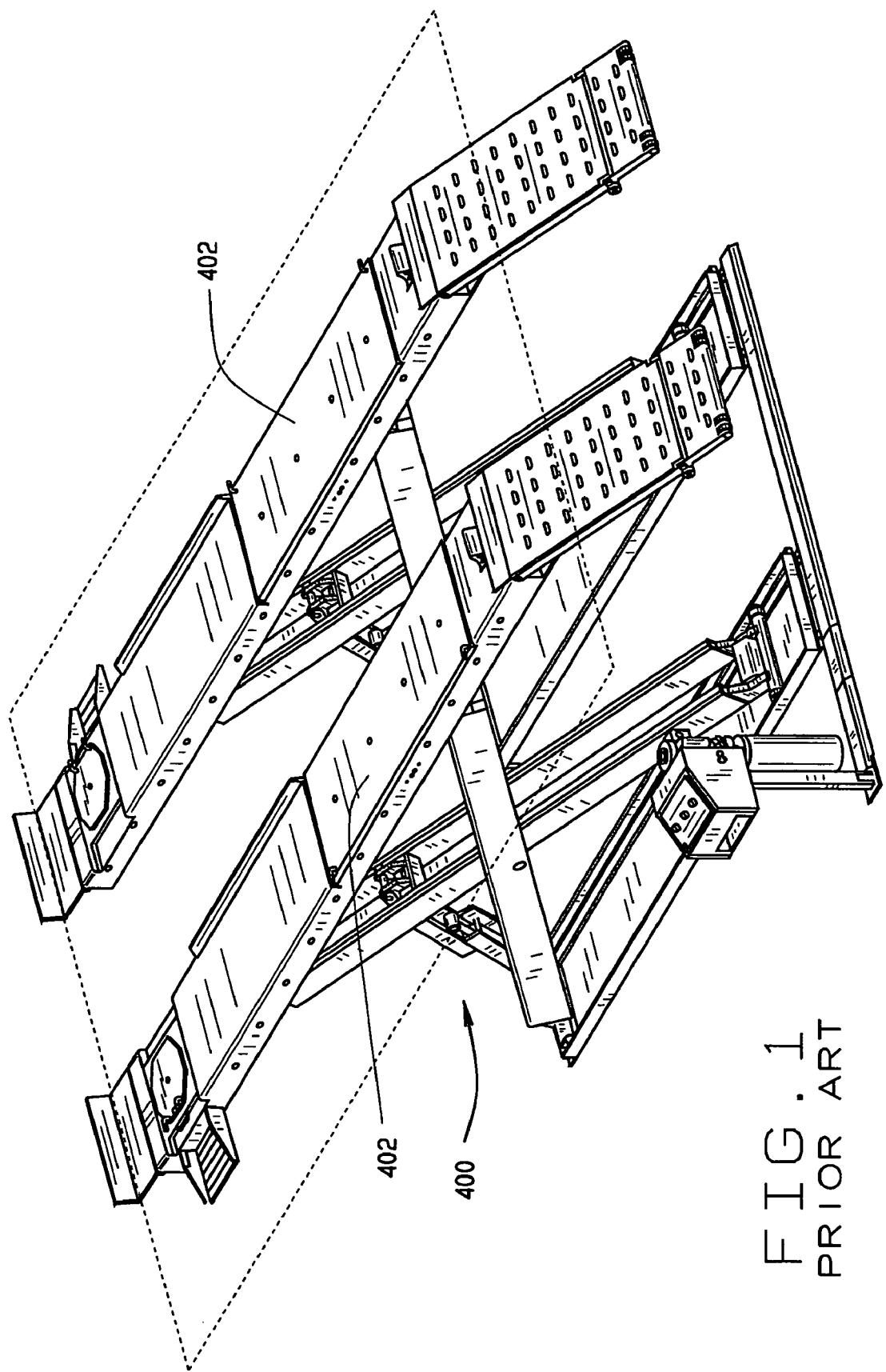
FIG. 1 is a perspective illustration of a prior art vehicle lift system.
Figure 2:
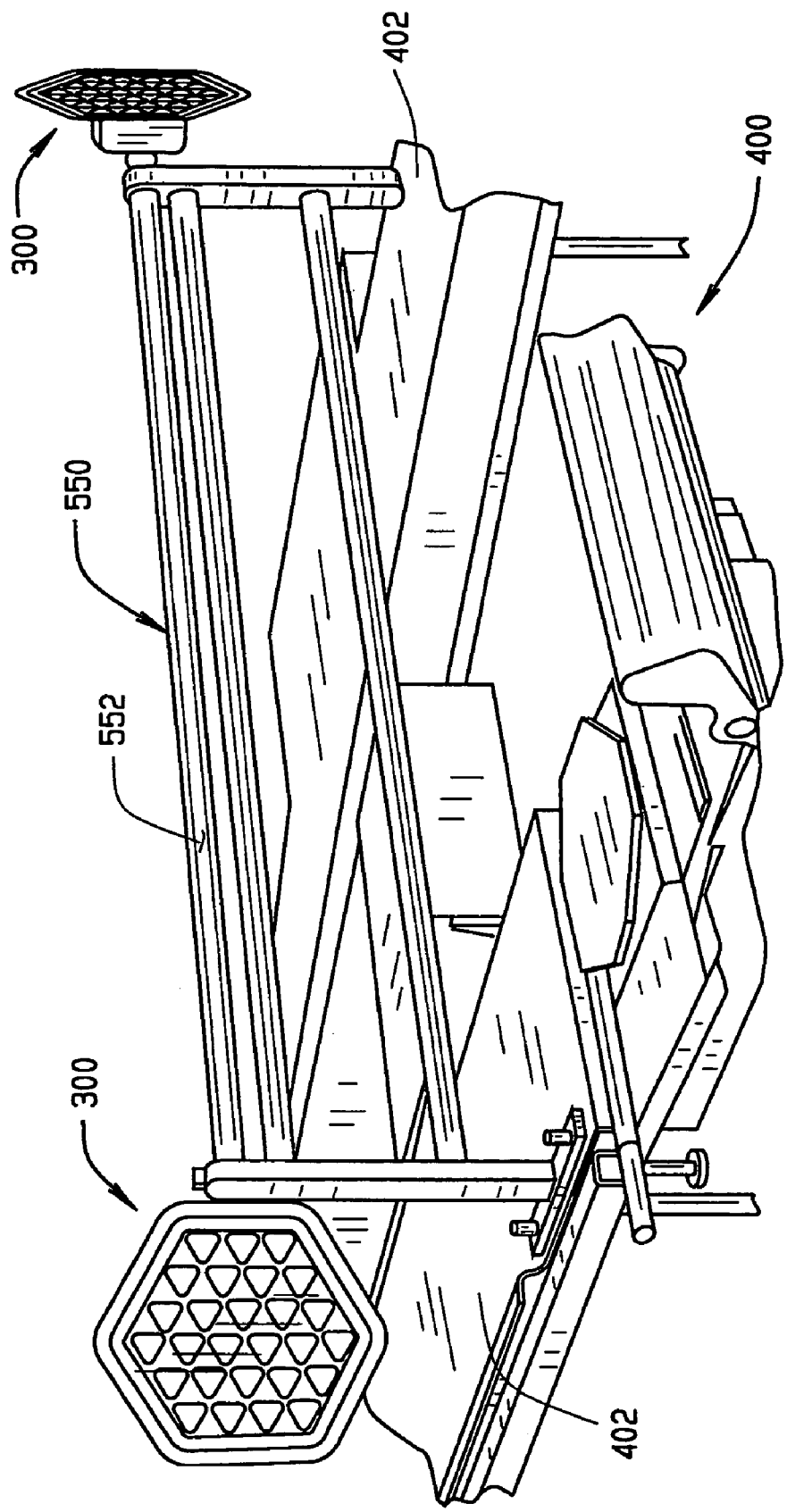
FIG. 2 is a perspective illustration of a prior art sensor calibration system.

In a second method of the present invention, the initial step of establishing a "home" or "calibration" measurement set for the imaging sensor array components 202 requires defining a reference plane P utilizing the vehicle wheel alignment system 100 and a conventional calibration fixture 550 adapted for use with alignment targets 300, such as shown in FIG. 2. A calibration fixture 550 consists of a rigid support structure 552 having known dimensions, for supporting two or more alignment targets 300 at opposite ends. The calibration fixture 550 is placed across the pair of runways 402 of the vehicle lift system 400 in a predetermined position, within the field of view (FOV) of the components 202 of the imaging sensor array 200, and images of the alignment targets 300 are acquired by the imaging sensor array 200. From the acquired images, the vehicle wheel alignment system 100 is configured to establish an initial measurement set or relationship between the imaging sensor array components 202 and the calibration fixture 550. Alternatively, the initial measurement set or relationship may be established between the imaging sensor array 200 and a planar surface P substantially defined by the upper surfaces of the pair of runways 402 upon which the calibration fixture 550 is disposed, using the known dimensions of the calibration fixture 550. Those of ordinary skill in the art will recognize that the initial measurement set or relationship may be determined from either the observed pose of the alignment targets 300, from calculated values based on the observed pose of the alignment targets 300, or from a combination of observed and calculated values.

Following an alteration of pose of the components 202 of the imaging sensor array 200, such as in response to a positional change in the vehicle lift system 400, the calibration fixture 550 is returned to the predetermined position across the pair of runways 402 of the vehicle lift system 400 if it was previously removed, where it is within the field of view FOV of the components 202 of the imaging sensor array 200. A second measurement set is acquired from a new set of images of the calibration fixture 550 generated by the imaging sensor array 200. A comparison of the second measurement set with the initial measurement set yields one or more adjustment factors for the altered pose of the components 202 of the imaging sensor array 200 from the initial pose, relative to the alignment targets 300.

In a third method of the present invention, the initial step of establishing a "home" or "calibration" measurement set for the imaging sensor array components 202 requires defining a reference plane P utilizing the vehicle wheel alignment system 100 and a cross-looking camera calibration fixture 600 adapted for use with alignment targets 300, such as shown in FIG. 4. A cross-looking sensor calibration fixture 600 consists of a pair of alignment target support structures 602, one of which supports two or more alignment targets 300, and one of which supports at least one alignment target 300 and at least one cross-looking imaging sensor 604.

Each support structure 602 of the calibration fixture 600 is placed on a runway 402 of the vehicle lift system 400 in a predetermined position, within the field of view FOV of the components 202 of the imaging sensor array 200. The cross-looking imaging sensor 604 is positioned such that at least one alignment target 300 on the second support structure 602 is within an associated field of view. Images acquired by the cross-looking imaging sensor 604 are processed by the vehicle alignment system 100 to determine a relationship between each of the support structures 602, in effect, establishing a virtual connection between the two support structures 602. Once the relationship between the two support structures 602 is established, the process proceeds in much the same manner as if a conventional calibration fixture 500 were being utilized.

Images of the alignment targets 300 on the support structures 602 associated with each side of the vehicle support system 400 are acquired by the imaging sensor array 200. From the acquired images, the vehicle wheel alignment system 100 is configured to establish an initial measurement set or relationship between the imaging sensor array components 202 and the cross-looking calibration fixture 600. Alternatively, the initial measurement set or relationship may be established between the imaging sensor array 200 and a planar surface P substantially defined by the upper surfaces of the pair of runways 402 upon which the cross-looking calibration fixture 600 is disposed, using the known dimensions of the calibration fixture supports 602. Those of ordinary skill in the art will recognize that the initial measurement set or relationship may be determined from either the observed pose of the alignment targets 300 on the calibration fixture 600, from calculated values based on the observed pose of the alignment targets 300 on the calibration fixture 600, or from a combination of observed and calculated values.

Following an alteration of the pose of the components 202 of the imaging sensor array 200, such as in response to a positional change in the vehicle lift system 400, a new relationship between each support structure 602 of the cross-looking calibration fixture 600 is determined using the cross-looking imaging sensor 604, establishing a virtual connection between the two support structures 602.

A second measurement set associated with the alignment targets 300 is then acquired from a new set of images of the cross-looking calibration fixture 600 generated by the imaging sensor array 200. A comparison of the second measurement set with the initial measurement, compensating for any identified changes in the relationship between the alignment targets 300 and/or support structures 602, set yields one or more adjustment factors for the altered pose of the components 202 of the imaging sensor array 200 from the initial pose, relative to the alignment targets 300 on the calibration fixture 600.

Figure 6:
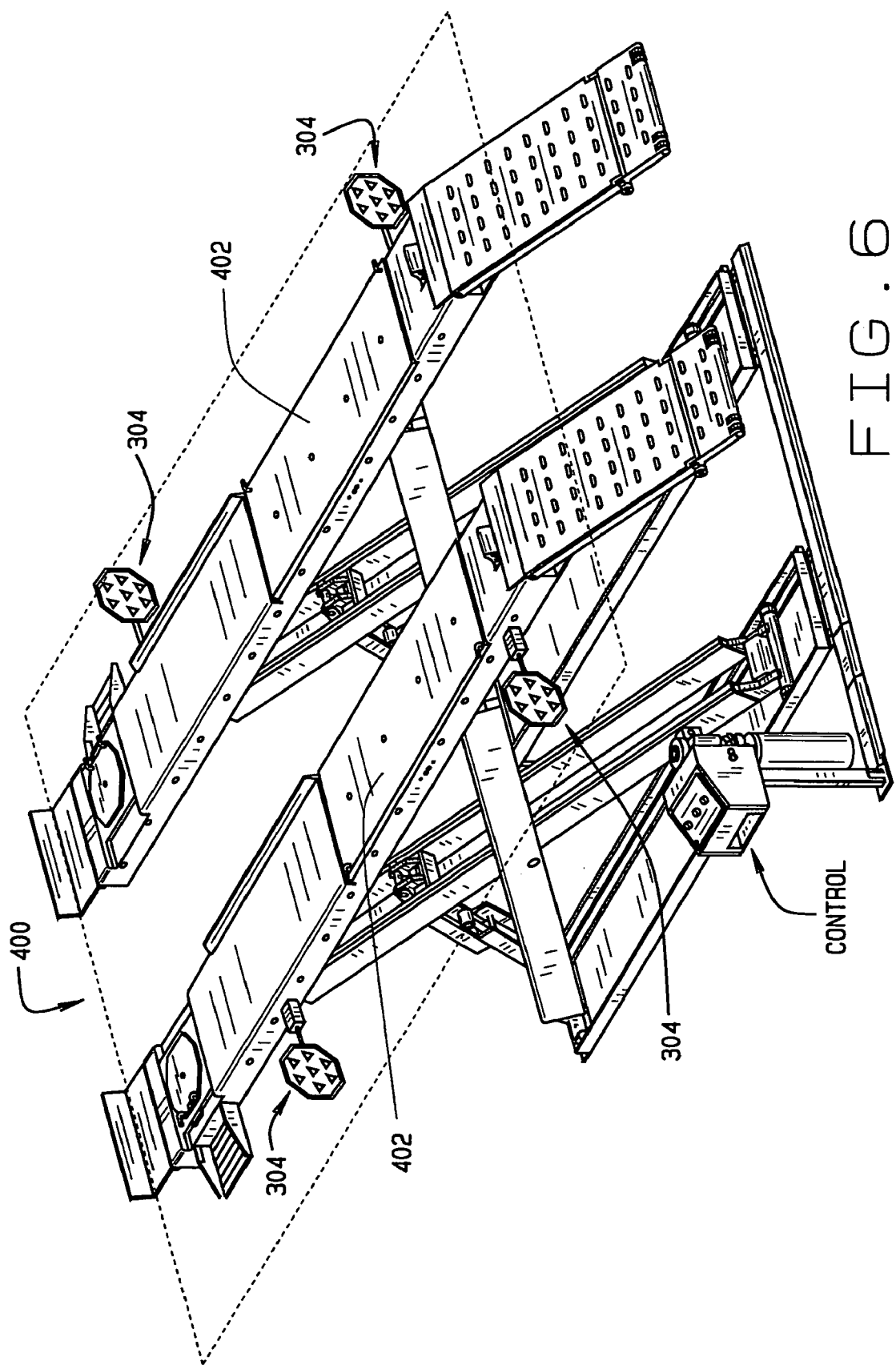
FIG. 6 is a perspective illustration of a vehicle lift system associated with optical targets of the present invention.

In a fourth method of the present invention, the initial step of establishing a "home" or "calibration" measurement set for the imaging sensor array components 202 requires defining a reference plane P utilizing the vehicle wheel alignment system 100 and a set of optical targets 304 or observable features which are mounted to a surface of a vehicle lift system 400, as shown in FIG. 6. Images of the optical targets 304 or observable features are acquired by the imaging sensor array 200. From the acquired images, the vehicle wheel alignment system 100 is configured to establish relationship between the imaging sensor array components 202 and the surface of the vehicle lift system 400. Those of ordinary skill in the art will recognize that the initial measurements or relationship may be determined from either the observed pose of the optical targets 304 or visible features, from calculated values based on the observed pose of the optical targets 304 or visible features, or from a combination of observed and calculated values.

Following an alteration of the position and/or orientation of the components 202 of the imaging sensor array 200, such as in response to a positional change in the vehicle lift system 400, a second set of images of the optical targets 304 is generated by the imaging sensor array 200. From the second set of acquired images, the vehicle wheel alignment system 100 is configured to determine a second relationship between the imaging sensor array components 202 and the surface of the vehicle lift system 400. Assuming that the configuration of the vehicle lift system 400 has not changed between the acquisition of the first set of images and the second set of images, a comparison of the second determined relationship with the initial determined relationship yields one or more adjustment factors for the altered pose of the components 202 of the imaging sensor array 200 from the initial pose, relative to the optical targets 304.

Figure 7:
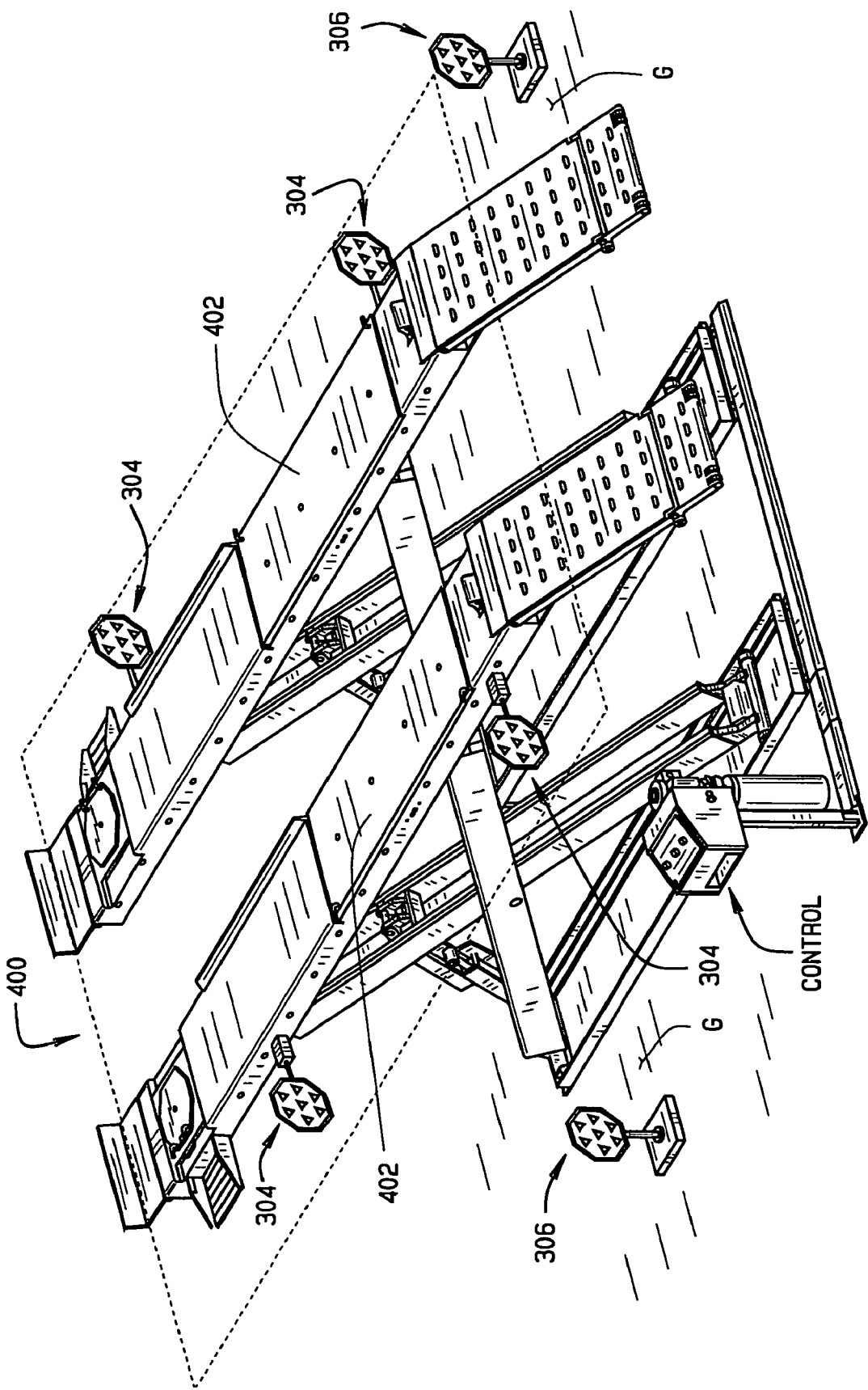
FIG. 7 illustrates the vehicle lift system of FIG. 6 disposed in relationship to a set of optical targets of the present invention mounted to a fixed surface.

In a fifth method of the present invention, the initial step of establishing a "home" or "calibration" measurement set for the imaging sensor array components 202 requires defining a reference plane P utilizing the vehicle wheel alignment system 100 and a set of optical targets 306 or visible features which are mounted to a fixed surface G, such as the floor, which are always within the field of view FOV of the imaging sensor array 200, as shown in FIG. 7. Images of the optical targets 306 or visible features are acquired by the imaging sensor array 200. From the acquired images, the vehicle wheel alignment system 100 is configured to establish relationship between the imaging sensor array components 202 and the fixed surface G. When the vehicle wheel alignment system 100 is calibrated, a transform between the stationary target 306 coordinate system and the common reference coordinate system will be computed. In the case of a left front imaging sensor 202LF this would be notated as TLFTgtToC. In the "home" position, the imaging sensor array 200 would measure the target 306 that determines the transform between the imaging sensor component 202 and the target 306, TLFSnrToTgt. The transform between the imaging sensor component 202 and the common reference plane would be the combination of the transform between the imaging sensor component 202 and the target 306, and the transform between the target 306 and the common reference coordinate system, TLFtoC=TLFSnrToTgt+TLFTgtToC.

One of ordinary skill in the art will recognize that this concept may be easily expanded for differing placements of imaging sensors components 202 and stationary targets 306 using knowledge of how the various components relate to one another either through fixed placement of components, calibration of components, or direct measurement of the relationships between components.

Those of ordinary skill in the art will recognize that the initial measurements or relationships may be determined from either the observed pose of the optical targets 306 or visible features, from calculated values, such as vehicle alignment angles, based on the observed pose of the optical targets 306 or visible features, or from a combination of observed and calculated values.

Following an alteration of the pose of the components 202 of the imaging sensor array 200, or a change in the field of view FOV, such as in response to a positional change in the vehicle lift system 400, a second set of images of the optical targets 306 or visible features is generated by the imaging sensor array 200. From the second set of acquired images, the vehicle wheel alignment system 100 is configured to determine a second relationship between the imaging sensor array components 202 and the fixed surface G. A comparison of the second determined relationship with the initial determined relationship yields one or more adjustment factors for the altered pose of the components 202 of the imaging sensor array 200 from the initial pose, relative to the optical targets 306 or visible features.

In addition to calculating adjustment factors for the altered pose of the components 202 of the imaging sensor array 200, the use of optical targets 306 or visible features associated with a fixed surface G enables the vehicle wheel alignment system 100 to optionally identify changes in the pose of optical targets 304 or visible features associated with the movable components of the vehicle lift system 400, such as shown in FIG. 6. As the vehicle lift system runways 402 move up and down, the vehicle support runways 402 may flex, twist, or move at different rates or amounts. By providing the vehicle wheel alignment system 100 with optical targets 306 or visible features associated with a fixed surface G, the changes in the vehicle lift system 400 can be identified relative to the fixed optical targets 306 or visible features, enabling the vehicle wheel alignment system to optionally identify additional adjustment factors as necessary.

The present invention can be embodied in-part in the form of computer-implemented processes and apparatuses for practicing those processes. The present invention can also be embodied in-part in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in-part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A method for utilizing a movable imaging sensor of a machine vision vehicle wheel alignment system, comprising:
    acquiring at least a first image of a visible feature on an object within a field of view of the imaging sensor;
    establishing from said at least one acquired first image, a first measurement set associated with said visible feature, said first measurement set related to a current pose of the imaging sensor;
    altering said pose of the imaging sensor and of said object associated with said visible feature;
    acquiring at least a second image of said visible feature on said object with the imaging sensor;
    establishing from said at least one acquired second image, a second measurement set associated with said object in said altered pose; and
    establishing a mathematical relationship between said first measurement set and said second measurement set.

2. The method of claim 1 wherein said at least one visible feature is an optical target.

3. The method of claim 1 wherein said first measurement set includes a measure of at least one vehicle wheel alignment angle, and said second measurement set includes a second measure of said at least one wheel alignment angle.

4. The method of claim 1 wherein said first measurement set is associated with a surface of a vehicle lift system, and said second measurement set is associated said surface of said vehicle lift system.

5. The method of claim 1 wherein said at least one object a vehicle.

6. The method of claim 1 wherein said at least one object a calibration system.

7. The method of claim 1 wherein said at least one object a vehicle lift system.

8. The method of claim 1 wherein said visible feature is associated with a vehicle wheel alignment angle, said vehicle wheel alignment angle remaining substantially unchanged in response to said change in pose of said object.

9. A method for utilizing a movable imaging sensor of a machine vision vehicle wheel alignment system, comprising:
    acquiring at least a first image of at least one visible feature on an object within a field of view of the imaging sensor;
    establishing a first reference associated with a first pose of said imaging sensor relative to said at least one visible feature;
    altering a pose of said imaging sensor and of said object associated with said at least one visible feature;
    acquiring at least one second image of said visible feature with said imaging sensor;
    establishing a second reference associated with said altered pose of said imaging sensor relative to said at least one visible feature; and
    establishing a relationship between said first and second references.

10. The method of claim 9 wherein each reference is further associated with a surface of a vehicle lift system.

11. The method of claim 9 wherein each reference is further associated with a vehicle.

12. The method of claim 11 wherein each reference is further associated with a vehicle wheel alignment angle which remains unchanged between acquisition of said first and second images.

13. The method of claim 9 further including the step of positioning a calibration fixture within said field of view of the imaging sensor, said at least one visible feature associated with said calibration fixture.

14. The method of claim 13 wherein said calibration fixture includes at least one cross-looking imaging sensor.

15. A method for identifying pose changes between at least two components of a vehicle lift system using a movable imaging sensor of a vehicle wheel alignment system, comprising:
    acquiring, with the movable imaging sensor, an image of at least one visible feature associated with a fixed surface;
    acquiring, with the movable imaging sensor, at least one image of a set of visible features associated with the components of said vehicle lift system in an initial pose;
    identifying a first reference measure between the initial pose of the imaging sensor and the at least one visible feature associated with the fixed surface using the acquired image thereof;
    establishing a first relationship between the components of the vehicle lift system in an initial pose using the acquired image thereof;
    altering a pose of said imaging sensor;
    altering a pose of the vehicle lift system;
    acquiring, with the movable imaging sensor at said altered pose, an altered-pose image of said at least one visible feature associated with a fixed surface;
    acquiring, with the movable imaging sensor at said altered pose, at least one altered-pose image of a set of visible features associated with the components of said vehicle lift system in said altered pose;
    identifying a second reference measure between the altered pose of the imaging sensor and the at least one visible feature associated with the fixed surface using the acquired altered-pose image thereof;
    establishing a second relationship between the components of the vehicle lift system in said altered pose using the acquired altered-pose image thereof;
    identifying a first change between said first and second reference measures;
    identifying a second change between said first and second relationships;
    utilizing said first and second changes to identify a change in a pose between said components of the vehicle lift system and said imaging sensor.

16. An improved vehicle wheel alignment system including a set of imaging devices configured to acquire images of visible features during a vehicle service procedure, the improvement comprising:
    a first common support structure supporting at least a first pair of imaging devices in the set of imaging devices, said common support structure displaced outward from a first lateral side of a vehicle support structure, in proximity to a lateral midline of said vehicle support structure;

a second common support structure supporting at least a second pair of imaging devices in the set of imaging devices, said second common support structure displaced outward from a second lateral side of said vehicle support structure, in proximity to said lateral midline of said vehicle support structure;

wherein each pair of imaging devices includes a first imaging device having a field of view encompassing at least a portion of a front vehicle wheel, and a second imaging device having a field of view encompassing at least a portion of a rear vehicle wheel; and wherein each imaging device in said pairs of imaging devices has a field of view encompassing at least a portion of said vehicle support structure.

17. A method for determining changes in a spatial position of an imaging sensor associated with a vehicle wheel alignment system, comprising:

acquiring at least a first image of a visible feature with said imaging sensor;

establishing a first measurement set associated with a first spatial position of the imaging sensor and said visible feature from said at least one acquired first image;

altering said spatial position of the imaging sensor and of said visible feature;

acquiring at least a second image of said visible feature with the imaging sensor;

establishing a second measurement set associated with a second spatial position of the imaging sensor and said visible feature from said at least one acquired second image; and establishing a relationship between the first and second spatial positions of the imaging sensor utilizing said first and second measurement sets.

18. A method for measuring wheel alignment angles with a movable imaging sensor of a machine vision vehicle wheel alignment system operating in conjunction with a movable vehicle lift mechanism, comprising:

acquiring at least a first image of at least one visible feature within a field of view of the imaging sensor, said at least one visible feature operatively associated with the movable vehicle lift mechanism;

establishing a first reference associated with a current pose of the imaging sensor from said at least one acquired first image;

altering said pose of the imaging sensor;

altering a pose of the movable vehicle lift mechanism;

acquiring at least a second image of said visible feature with the imaging sensor;

establishing a second reference associated with said altered pose of the imaging sensor from said at least one acquired second image; and establishing a relationship between said first and second references utilizing an unaltered parameter associated with said visible feature.

19. The method of claim 18 wherein said unaltered parameter associated with said visible feature is a vehicle wheel alignment angle.

20. The method of claim 18 wherein said unaltered parameter associated with said visible feature is an established surface of said vehicle lift mechanism.

* * * * *

UNITED STATES PATENT AND TRADEMARK OFFICE
CERTIFICATE OF CORRECTION

| | | |
|---|---|---|
| PATENT NO. | : 7,453,559 B2 | Page 1 of 1 |
| APPLICATION NO. | : 11/461309 | |
| DATED | : November 18, 2008 | |
| INVENTOR(S) | : Daniel R. Dorrance, Timothy A. Strege and Leigh R. Burns, Jr. | |

It is certified that error appears in the above-identified patent and that said Letters Patent is hereby corrected as shown below:

On the title page item (75), under "Inventors", the first named inventor reads "Daniel R. Dorran"; it should read -- Daniel R. Dorrance --

Signed and Sealed this

Second Day of June, 2009

JOHN DOLL
*Acting Director of the United States Patent and Trademark Office*